Patented June 17, 1969

3,450,056
CANNED MOTOR PUMP
Thomas J. Heathcote and Michael Stark, Oakmont, Pa., assignors to Westinghouse Electric Corporation, Pittsburgh, Pa., a corporation of Pennsylvania
Filed July 18, 1967, Ser. No. 654,257
Int. Cl. F04d 13/06
U.S. Cl. 103—87                                  7 Claims

ABSTRACT OF THE DISCLOSURE

The thrust runner and thrust bearing for a canned motor pump are located on the end of the shaft opposite the main impeller, thereby being in a relatively cool area. The runner is bolted rather than keyed to the shaft and it can be removed without removing the pump from the volute or casing. Since the pump is run upside down, with the volute at the top, the thrust bearing can never run dry. A stator end ring is clamped between the stator housing and a stator cap which is bolted to the stator housing and houses the thrust runner and bearing. A stator can is factory welded to a short ring located at each end of the can. The outside diameter of one ring is smaller than the stator bore. A tool is used to grab this ring with the can attached and pull the can into position in the stator. Each ring has a lip so constructed that the ring can be field welded to the pump by a stick electrode. Thus, the stator can is field replaceable.

Background of the invention

This invention relates, generally, to centrifugal pumps and, more particularly, to canned motor pumps.

Prior canned motor pumps have operated satisfactorily, but they are difficult to service in the field and in many cases must be returned to the factory when repairing is required. This is caused by the manner in which they have been constructed. For example, the cans required sophisticated welding techniques, wound stators have been buried and welded in pressure vessels and terminals had internal inaccessible brazed joints.

An object of this invention is to provide a canned motor pump that is completely field serviceable.

Another object of the invention is to provide a stator can that is field replaceable.

A further object of the invention is to locate the thrust runner and thrust bearing in a relatively cool area where lubrication is assured and they can be readily removed from the pump shaft without removing the pump from the volute or casing.

Other objects of the invention will be explained fully hereinafter or will be apparent to those skilled in the art.

Summary of the invention

In accordance with one embodiment of the invention, a stator end ring of a canned motor pump is clamped between the stator housing and a stator cap which is bolted to the stator housing and houses the thrust bearing and thrust runner which is bolted to the end of the shaft opposite the main impeller, thereby being in a relatively cool area and being removable without removing the pump from the volute or casing. Each end of the stator can is factory welded to a short ring. The outside diameter of one ring is smaller than the stator bore. A tool is used to grab this ring with the can attached and pull the can into position in the stator. Each ring has a lip so constructed that the ring can be field welded to the pump by a stick electrode. The pump is run upside down, with the volute at the top, thereby assuring that the thrust bearing can never run dry.

Brief description of the drawing

For a better understanding of the nature and objects of the invention, reference may be had to the following detailed description, taken in conjunction with the accompanying drawing, in which.

Description of the preferred embodiment

Figure 1A:
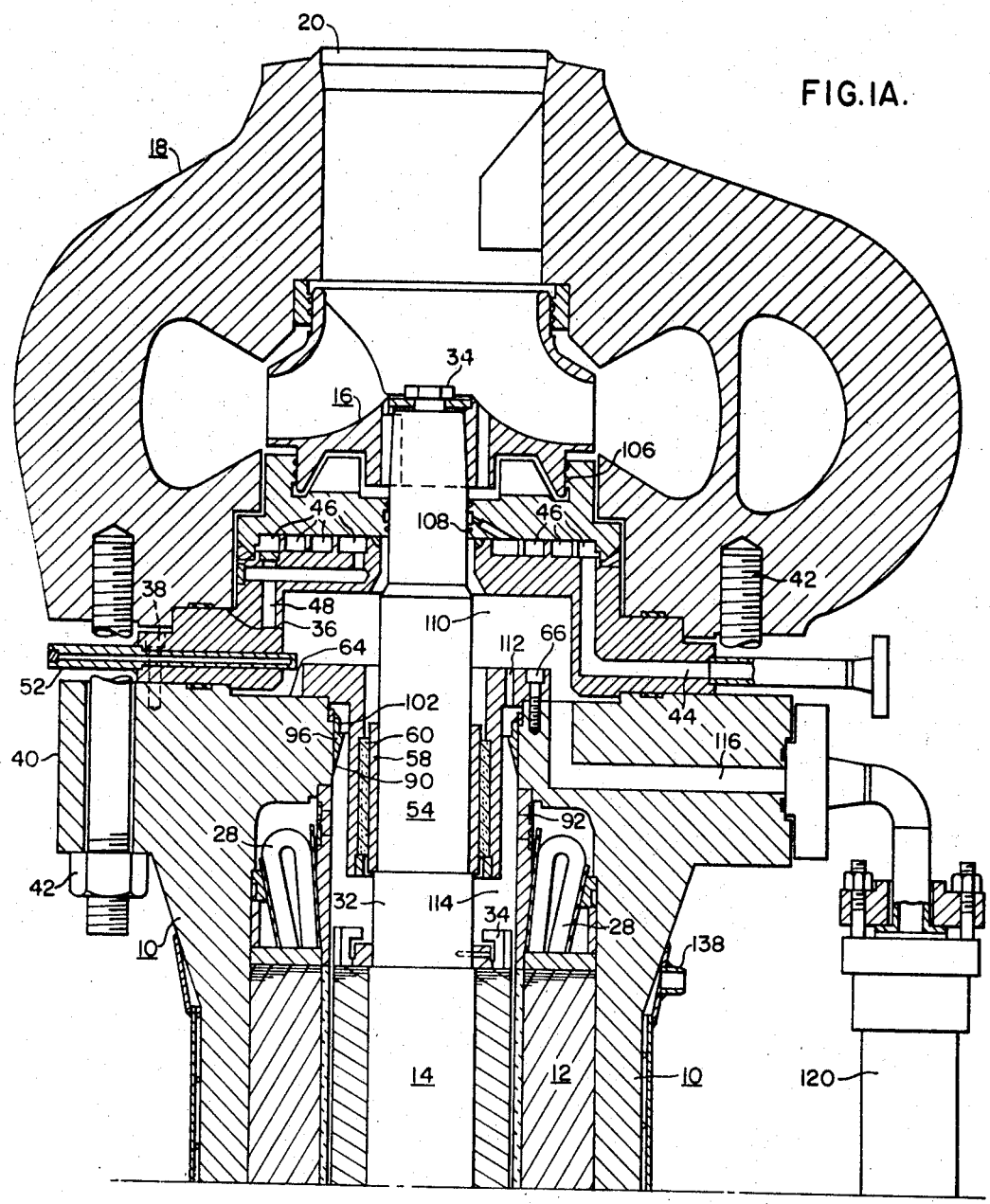
FIGURE 1A and FIGURE 1B are views, in longitudinal section, of a canned motor pump embodying principal features of the invention.
Figure 1B:
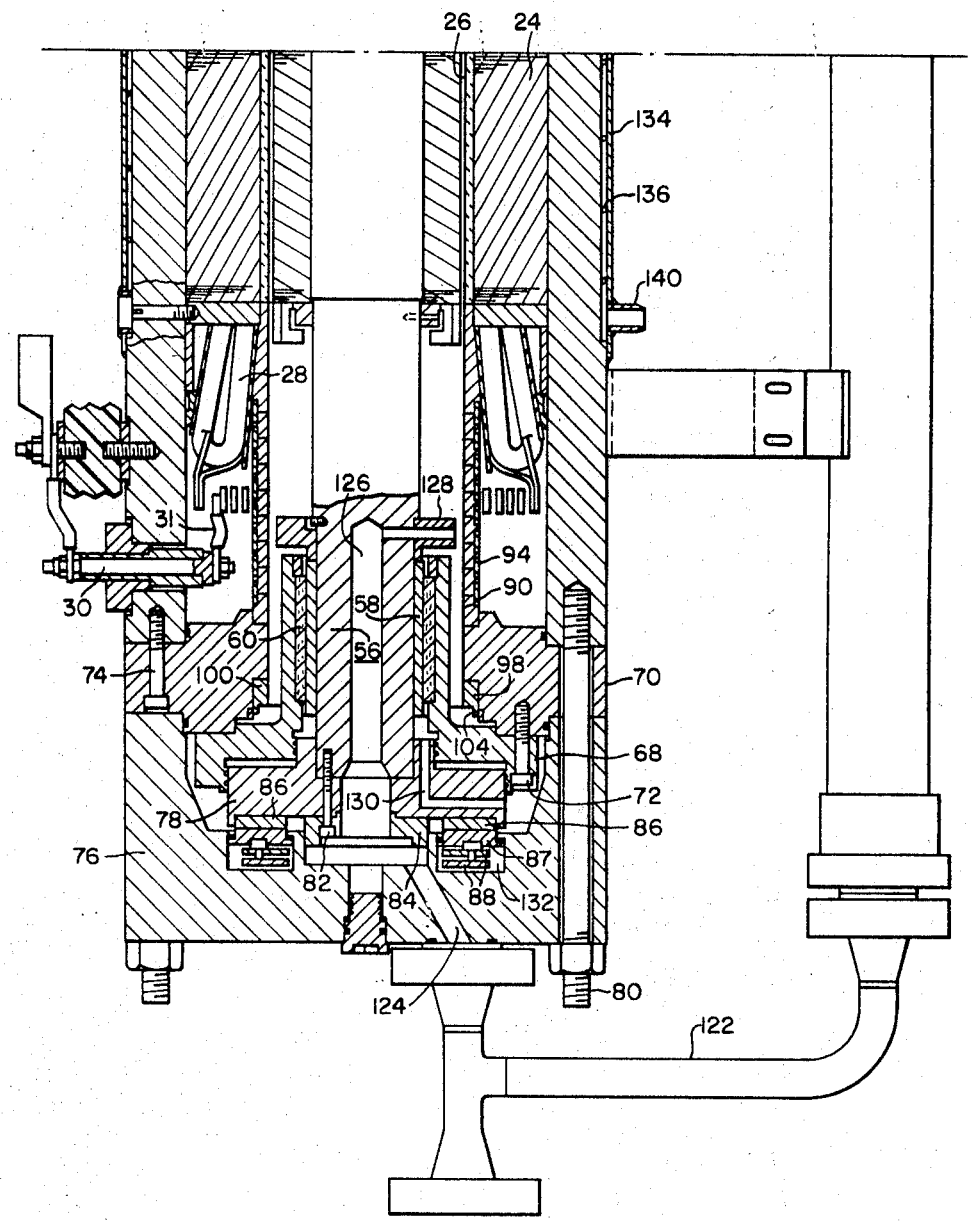
Figure 2:
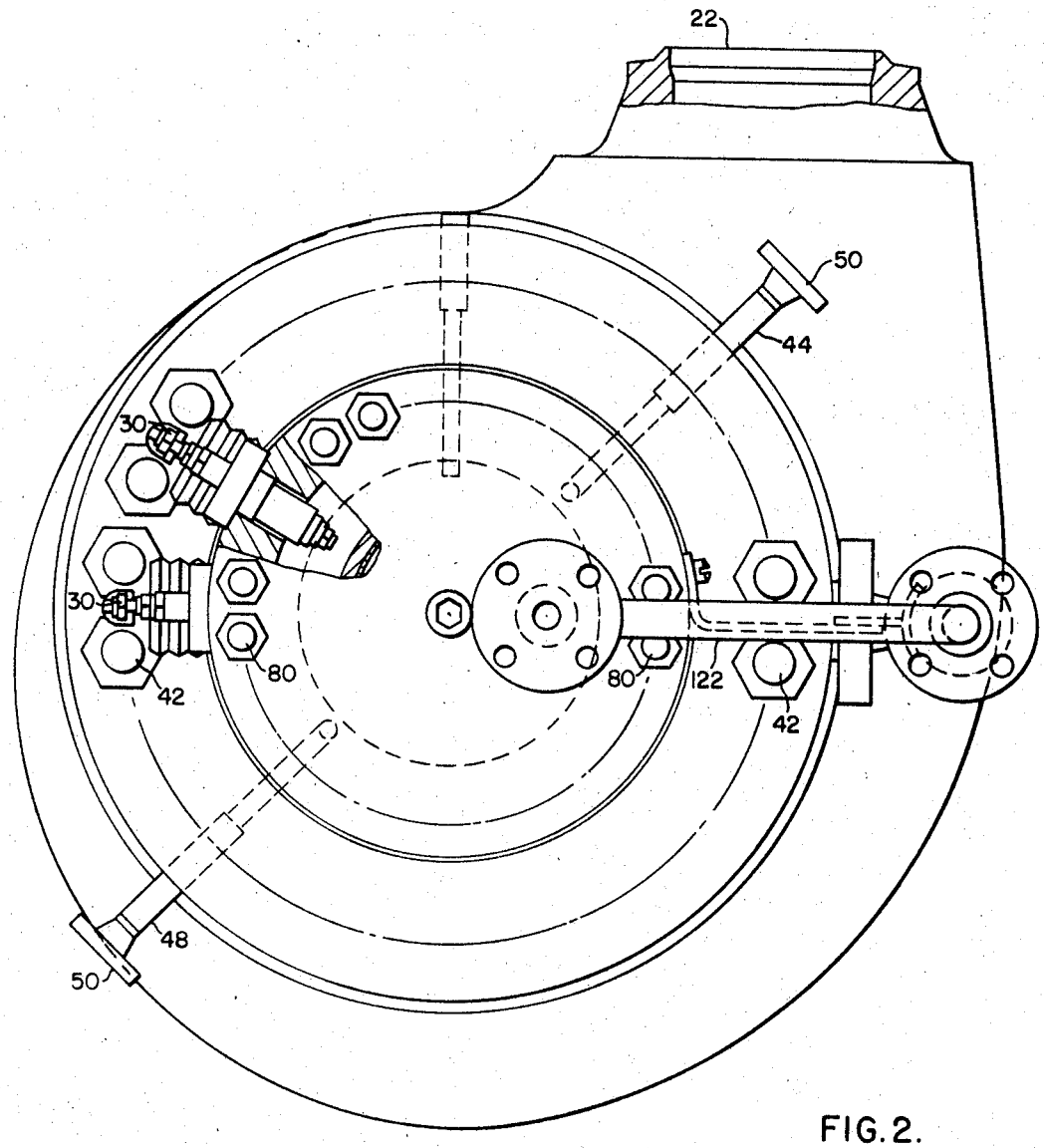
FIG. 2 is a view, in plan, of the canned motor pump shown in FIG. 1.

Referring to FIGURES 1A and 1B of the drawing, the canned motor pump structure shown therein comprises a generally cylindrical stator housing 10, a stator assembly 12, a rotor assembly 14, a main impeller 16 and a casing or volute 18 for the impeller 16. The casing 18 has an intake opening 20 and a discharge opening 22, shown in FIG. 2. Thus, the pump may be connected in a circulatory system and utilized to circulate a liquid in the system.

The stator assembly 12 includes a plurality of stacked laminations 24, having a cylindrical bore 26 therethrough, and stator windings 28 disposed in slots in the laminations 24 in the usual manner. Electrical connections may be made to the windings 28 by means of terminal connectors 30 which extend through the housing 10 and are connected to the windings 28 by conductors 31 inside the housing.

The rotor assembly 14 includes a shaft 32 and rotor windings 34 which may be of the squirrel cage type. As illustrated, the impeller 16 is attached to the upper end of the shaft 32 by means of a bolt 34. In the present instance the pump is operated with the impeller and the volute at the top of the pump. A thermal barrier 36 is attached to the upper end of the stator housing 10 by cap screws 38 and is disposed between the end of the stator housing and the pump casing 18. The casing 18 is removably attached to an outwardly extending flange 40 on the stator housing 10 by means of bolts 42 which extend through the flange 40 and are threaded into the casing 18. A cooling liquid may be circulated through passageways 44, 46 and 48 in the thermal barrier 36. External connections may be made to the passageways 44 and 48 by means of flange connections 50 shown in FIG. 2. A thermocouple well 52 may be provided in the terminal barrier 36 for temperature indicating purposes.

The rotor shaft 32 is rotatably mounted in radial bearing assemblies 54 and 56. The upper bearing assembly 54 includes a bearing journal 58 secured to the shaft 32, a bearing sleeve 60 composed of a suitable material, such as graphite, and a bearing support 62 which is attached to an inwardly extending flange 64 on the stator housing 10 by means of cap screws 66. Likewise, the lower radial bearing assembly 56 includes a bearing journal 58, a bearing sleeve 60 and a bearing support 68 which is attached to a stator end ring 70 by means of cap screws 72. The end ring 70 may be considered part of the stator housing 10 and is attached to the stator housing by means of cap screws 74.

The end ring 70 is also clamped between the stator housing 10 and a stator end can 76 which houses a thrust runner 78. The end cap 76 is removably attached to the stator housing by means of bolts 80 which extend through the end cap 76 and the end ring 70, and are threaded into the lower end of the stator housing 10.

The thrust runner 78 is attached to the lower end of the rotor shaft 32 by means of cap screws 82 which extend through a collar 84 and the thrust runner 78 and are threaded into the rotor shaft 32. The thrust runner 78 is supported by a bearing ring 86, bearing shoes 87 and support links 88 mounted in the end cap 76. Since the thrust runner and bearing are at the opposite end of the shaft 32 from the impeller 16, they are in a relatively cool area and their lubrication is assured since they are at the bottom of the pump assembly.

In order to seal the stator laminations 24 and windings 28 within the stator housing 10 to protect them from contact with the liquid being handled by the pump, a cylindrical stator can 90 extends through the stator bore 26 and backup sleeves 92 and 94 disposed at the upper and the lower ends, respectively, of the laminations 24. The stator can 90 is composed of a relatively thin corrosion resistant material, such as stainless steel. It is reinforced by the stator laminations and the backup sleeves, thereby enabling it to withstand a relatively high pressure.

In order that the stator can 90 may be replaced in the field, if necessary, the upper end of the can is factory welded, or otherwise secured, to a ring 96. Likewise, the lower end of the can 90 is factory welded to a ring 98. The outside diameter of the ring 96 is slightly smaller than the diameter of the stator bore 26. A suitable tool is used to grab this ring with the can attached and pull the can into position in the stator. When the can is in position, the lower ring 98 engages a ledge 100 on the inner periphery of the end ring 70 which functions as a part of the stator housing. The upper ring 96 has a lip 102 which can be welded to the inner periphery of the stator housing 10 by a stick electrode. Likewise, the lower ring 98 has a lip 104 which can be welded to the inner periphery of the end ring 70 which is a part of the stator housing. In this way, the stator can 90 is field replaceable.

When the pump is connected in a circulatory system, liquid seeps past labyrinth seals 106 and 108 into a cavity 110, through the upper bearing assembly 54 and also through a passageway 112 in the bearing support 62 into rotor cavity 114. The liquid also flows from the cavity 110 through a passageway 116 in the stator housing 10, an external heat exchanger 120, pipe connections 122, passageways 124 and 126 in the stator end cap 76 and the lower end of the rotor shaft 32, respectively, to an auxiliary impeller 128 driven by the shaft 32. The auxiliary impeller circulates the liquid through the motor gap between the rotor 14 and the stator can 90 and through and around the upper bearing assembly 54 into the cavity 110 from which it returns through the heat exchanger 120 to the auxiliary impeller.

The pressure head developed by the auxiliary impeller 128 also circulates liquid through the lower bearing assembly 56 and a passageway 130 in the thrust runner 78 to a chamber 132 which contains the thrust bearing members 86, 87, and 88. In this manner all of the bearings for the motor are properly lubricated. Also, the heat losses of the motor are absorbed by the circulating liquid. Additional cooling of the motor is provided by a jacket 134 which surrounds the portion of the stator housing 10 containing the stator laminations 24. The jacket 134 is spaced from the outside of the stator housing by a spirally wound rod 136. External connections may be made to the jacket 134 by means of fittings 138 and 140 to permit a cooling liquid to be circulated through the jacket.

From the foregoing description it is apparent that the motor pump may be completely disassembled and reassembled in the field, if necessary, thereby facilitating the making of necessary repairs in the field. Furthermore, the motor pump may be manufactured in sub-assemblies which can be processed through a manufacturing shop independently of each other. The total processing time is only the manufacturing time required for the most complex sub-assembly since the other sub-assemblies can be worked on concurrently. Accordingly, the invention provides a canned motor pump structure which may be readily and economically manufactured, which is efficient in operation, and which is completely field serviceable.

Since numerous changes may be made in the above-described construction and different embodiments of the invention may be made without departing from the spirit and scope thereof, it is intended that all subject matter contained in the foregoing description or shown in the accompanying drawings shall be interpreted as illustrative and not in a limiting sense.

What we claim is:

1. In a canned motor pump, in combination, a stator housing including a pair of spaced end rings, stator laminations disposed within the housing between said end rings, said end rings and said stator laminations forming a cylindrical bore therethrough, a cylindrical stator can disposed in said bore, a ring secured to each end of the stator can, the outside diameter of one ring being smaller than the diameter of the stator can, said one ring being hermetically secured to the inner diameter of one end of said stator can and both rings being secured to the housing end rings to seal the laminations within the housing.

2. The combination defined in claim 1 wherein the outside diameter of the other ring is larger than the diameter of the bore, to position the can within the bore, said other ring being secured hermetically to the outer diameter of the other end of said stator can.

3. The combination defined in claim 2 wherein a ledge encircles the inner periphery of the housing, and said other ring engages said ledge to position the can within the housing.

4. The combination defined in claim 2 including a stator end cap attached to the housing with one of the end rings disposed between the end of the housing and the end cap, and said cap being removable to provide access to the interior of the stator housing.

5. The combination defined in claim 1 including a rotor shaft extending through said bore, a main impeller attached to one end of the shaft, a casing for the impeller attached to one end of the stator housing, said casing being removable to provide access to said impeller, a thrust runner attached to the other end of the shaft, a housing for the runner attached to the other end of the stator housing and said runner housing being removable to provide access to said thrust runner.

6. The combination defined in claim 5 wherein the stator housing includes an end ring clamped between the runner housing and the stator housing, and one of said rings is secured to said end ring.

7. The combination defined in claim 1 including a rotor shaft extending through said bore, bearing assemblies rotatably supporting the shaft in the stator housing, a main impeller attached to one end of the shaft, a casing for the impeller attached to one end of the stator housing, a thermal barrier disposed between the casing and the stator housing, a thrust runner attached to the other end of the shaft, a housing for the runner attached to the other end of the stator housing, a stator end ring disposed between the runner housing and the end of the stator housing, said runner housing and said thrust runner and one of said bearing assemblies being removable to provide access to one of the can rings which is secured to the stator end ring, and the impeller casing and the thermal barrier and the other bearing assembly being removable to provide access to the other can ring which is secured to the stator housing.

References Cited

UNITED STATES PATENTS

| | | | |
|---|---|---|---|
| 2,687,695 | 8/1954 | Blom et al. | 103—87 |
| 2,887,061 | 5/1959 | Cametti et al. | 103—87 |
| 3,067,690 | 12/1962 | Kramer et al. | 103—87 |

ROBERT M. WALKER, *Primary Examiner.*

U.S. Cl. X.R.

310—86